United States Patent
Yasumoto

(10) Patent No.: US 10,001,372 B2
(45) Date of Patent: Jun. 19, 2018

(54) ANGULAR VELOCITY DETECTION DEVICE

(71) Applicant: Murata Manufacturing Co., Ltd., Nagaokakyo-shi, Kyoto-fu (JP)

(72) Inventor: Kensei Yasumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 189 days.

(21) Appl. No.: 15/066,015

(22) Filed: Mar. 10, 2016

(65) Prior Publication Data
US 2016/0187135 A1 Jun. 30, 2016

Related U.S. Application Data

(63) Continuation of application No. PCT/JP2014/070436, filed on Aug. 4, 2014.

(30) Foreign Application Priority Data

Sep. 26, 2013 (JP) .................................. 2013-199479

(51) Int. Cl.
*G01C 19/5607* (2012.01)
*G01C 19/5733* (2012.01)

(52) U.S. Cl.
CPC ..... *G01C 19/5607* (2013.01); *G01C 19/5733* (2013.01)

(58) Field of Classification Search
CPC .................................................. G01P 15/0922
See application file for complete search history.

(56) References Cited

U.S. PATENT DOCUMENTS

| | | | |
|---|---|---|---|
| 8,776,599 B2 * | 7/2014 | Hammer | G01C 19/5712 73/504.02 |
| 8,991,248 B2 * | 3/2015 | Imanaka | G01C 19/574 73/504.12 |
| 9,052,194 B2 * | 6/2015 | Seeger | G01C 19/5719 |

(Continued)

FOREIGN PATENT DOCUMENTS

| | | |
|---|---|---|
| JP | 2006-162314 A | 6/2006 |
| JP | 2007-245558 A | 9/2007 |

(Continued)

OTHER PUBLICATIONS

Official Communication issued in International Application PCT/JP2014/070436, dated Sep. 16, 2014.

*Primary Examiner* — Paul West
*Assistant Examiner* — Mark A Shabman
(74) *Attorney, Agent, or Firm* — Keating & Bennett, LLP

(57) ABSTRACT

An angular velocity detection device vibrates a vibration body and detects vibrations generated by angular velocity. The vibration body includes a center base portion, first detection beam sections extending from the center base section in a T shape and connected to each other at four corners, second detection-cum-drive beam sections extending from the first detection beam sections toward the center base portion side along diagonal lines of the vibration body, and mass bodies connected to both ends of each of the second detection-cum-drive beam portions. The second detection-cum-drive beam sections each perform flexural vibration within a plate surface in a direction perpendicular or substantially perpendicular to the diagonal line of the vibration body.

16 Claims, 7 Drawing Sheets

(56) References Cited

U.S. PATENT DOCUMENTS

| | | | |
|---|---|---|---|
| 2007/0214883 A1* | 9/2007 | Durante | G01C 19/5712 73/504.04 |
| 2008/0134781 A1* | 6/2008 | Noguchi | G01C 19/5642 73/504.15 |
| 2010/0077858 A1 | 4/2010 | Kawakubo et al. | |
| 2011/0032065 A1 | 2/2011 | Raczkowski | |
| 2011/0303007 A1* | 12/2011 | Rocchi | G01C 19/574 73/504.09 |
| 2012/0048017 A1* | 3/2012 | Kempe | G01C 19/5747 73/504.12 |
| 2012/0216613 A1 | 8/2012 | Honda | |
| 2012/0279300 A1* | 11/2012 | Walther | G01C 19/5712 73/504.03 |

FOREIGN PATENT DOCUMENTS

| | | |
|---|---|---|
| JP | 2008-190930 A | 8/2008 |
| JP | 2009-74996 A | 4/2009 |
| JP | 2010-19022 A | 1/2010 |
| JP | 2010-78500 A | 4/2010 |
| JP | 2011-40509 A | 2/2011 |
| JP | 2011-158319 A | 8/2011 |
| JP | 2012-519269 A | 8/2012 |
| JP | 2012-519270 A | 8/2012 |
| JP | 2012-177610 A | 9/2012 |
| WO | 20013/108804 A1 | 7/2013 |

\* cited by examiner

ANGULAR VELOCITY DETECTION DEVICE

BACKGROUND OF THE INVENTION

1. Field of the Invention

The present invention relates to angular velocity detection devices to detect angular velocities by making use of a Coriolis force.

2. Description of the Related Art

An angular velocity detection device includes a vibration body having a plurality of vibration modes. In a state in which the vibration body vibrates in a predetermined vibration mode (drive vibration mode), the angular velocity detection device detects vibrations in another vibration mode (detection vibration mode) generated in the vibration body due to action of an angular velocity causing a Coriolis force to work, and then detects the angular velocity.

Here, an example of the structure of a known angular velocity detection device will be described. Hereinafter, an axis along a direction perpendicular or substantially perpendicular to a plate surface of the angular velocity detection device (thickness direction) is taken as a Z axis of the orthogonal coordinate system. Further, two axes perpendicular or substantially perpendicular to each other along the plate surface are respectively taken as an X axis and a Y axis of the orthogonal coordinate system.

FIG. 8A is an X-Y surface plan view of an angular velocity detection device 201 according to a known example (for example, see Japanese Unexamined Patent Application Publication No. 2009-74996).

The angular velocity detection device 201 includes tuning forks 202A, 202B, 202C, and 202D, a base portion (supporter) 203, beams 204A, 204B, 204C, and 204D, and a frame body 205. The base portion 203 is disposed at the center of the angular velocity detection device 201, and fixed to an external structure. The frame body 205 is formed in a frame shape and encloses the base portion 203 within the frame. The beams 204A, 204B, 204C, and 204D extend from the base portion 203 in equiangular directions and are respectively connected to four corners of the frame body 205. The tuning forks 202A, 202B, 202C, and 202D respectively extend, from the base portion 203, between the beams 204A and 204B, 204B and 204C, 204C and 204D, and 204D and 204A, and each leading end thereof forks into two branches.

In the angular velocity detection device 201, in a state of vibrating in a predetermined vibration mode (drive vibration mode), when angular velocities about the X and Y axes act and cause Coriolis forces to work, vibrations in independent vibration modes (detection vibration mode) are generated at each of the X and Y axes. Accordingly, by detecting the vibrations in the respective detection vibration modes, the angular velocities about the X and Y axes can be detected. However, angular velocities about three axes cannot be detected by a single angular detection device. Accordingly, in order to detect angular velocities about the three axes, it is necessary to combine and use a plurality of angular velocity detection devices.

As such, an angular velocity detection device capable of detecting angular velocities about the three axes only by the single angular velocity detection device is also proposed.

FIG. 8B is an X-Y surface plan view of an angular velocity detection device 401 (for example, see Japanese Unexamined Patent Application Publication No. 2012-177610) according to a known example capable of detecting angular velocities about the three axes only by the single angular velocity detection device 401.

The angular velocity detection device 401 includes a frame 402, a base (base portion) 403, connectors 404, and pendulums (mass bodies) 405A, 405B, 405C, and 405D. The frame 402 is formed in a frame shape. The pendulums 405A, 405B, 405C, and 405D are disposed at the inside of the frame 402, and respectively extend from the four corners of the frame 402 being directed toward the center of the angular velocity detection device 401. The base 403 is formed in a frame shape, encloses the frame 402, and is fixed to an external structure. The connectors 404 connect the frame 402 and the base 403 to each other. In the angular velocity detection device 401, in a state of vibrating in a predetermined mode (drive vibration mode), when angular velocities about the X, Y, and Z axes act and cause Coriolis forces to work, vibrations in independent vibration modes (detection vibration mode) are generated at each of the X, Y, and Z axes. This makes it possible to detect vibrations in the respective vibration modes and consequently detect the angular velocities about the X, Y, and Z axes.

In general, angular velocity detection devices are required to be compact and have highly excellent detection sensitivity. However, due to advancement in miniaturization of angular velocity detection devices, resonant frequencies of the angular velocity detection devices become higher so that the detection sensitivity to angular velocities tends to be lowered. For example, in a digital camera or the like configured to detect a camera shake by making use of an angular velocity detection device, there is a case in which a camera shake detection sensitivity is decreased because of a large difference between a resonant frequency of the angular velocity detection device and a frequency of the camera shake. Accordingly, angular velocity detection devices are required to have a low resonant frequency even if the devices are miniaturized.

In order to lower the resonant frequency in an angular velocity detection device, it is effective to make a length of a beam that is connected to a mass body longer. For example, in order to lower the resonant frequency in the angular velocity detection device 401 shown in FIG. 8B, it is necessary to make the lengths of the beams of the pendulums 405A through 405D longer. However, because the connectors 404 and the base 403 are arranged at an outer side portion of the frame 402 that is arranged at an outer side portion of the pendulums 405A through 405D, the beams of the pendulums 405A through 405D cannot be lengthened unless the base 403 and the frame 402 are made larger together. As such, it is necessary to make the overall angular velocity detection device 401 larger so as to suppress (lower) the resonant frequency.

SUMMARY OF THE INVENTION

Accordingly, preferred embodiments of the present invention provide an angular velocity detection device capable of detecting angular velocities about three axes using only a single angular velocity detection device and capable of suppressing or lowering a resonant frequency even if the angular velocity detection device is miniaturized.

An angular velocity detection device according to a preferred embodiment of the present invention is an angular velocity detection device that includes a vibration body with a square outer periphery when a plate surface is viewed from above, a driver that vibrates the vibration body, and a detector that detects vibrations generated in the vibration body due to action of an angular velocity and outputs an output signal in accordance with the angular velocity. The vibration body includes a center base portion fixedly provided at the center of the outer periphery; four first detection beam sections that extend from the center base portion in parallel or substantially in parallel with four sides defining the outer periphery, fork into two branches extending in both side directions along each side of the outer periphery, and are connected to each other at four corners of the outer periphery; four second detection-cum-drive beam sections that extend from the first detection beam sections toward the center base portion side along each diagonal line of the outer periphery, and fork into two branches extending in both side directions along the center base portion and the first detection beam sections; and eight mass bodies connected to both ends of each of the second detection-cum-drive beam sections extending along the first detection beam sections. The driver causes each of the second detection-cum-drive beam sections to perform flexural vibration in a direction perpendicular or substantially perpendicular to the diagonal line within the plate surface.

In this structure, the driver causes each second detection-cum-drive beam section to perform flexural vibration within the plate surface in a direction perpendicular or substantially perpendicular to the diagonal line of the vibration body, such that the vibration body vibrates in a drive vibration mode. In the case where angular velocities act on the vibration body vibrating in the drive vibration mode, vibrations of corresponding detection modes are generated at each of the axes on which the angular velocities act. As such, this angular velocity detection device is able to obtain output signals corresponding to the angular velocities about the three axes even if only the single angular velocity device operates. Further, the vibration body is fixed to an external structure at the center base portion, and vibrates in the drive vibration mode by causing the second detection-cum-drive beam sections, extending toward the center base portion side along each of the diagonal lines of the vibration body, to perform flexural vibration in a direction perpendicular or substantially perpendicular to the diagonal line of the vibration body. This makes it possible to secure a sufficient length for each of the second detection-cum-drive beam sections along the diagonal line of the vibration body even if the outer periphery of the vibration body is made smaller. With this structure, the resonant frequency in the drive vibration mode is able to be suppressed.

It is preferable that the center base portion have a square or substantially square shape when the plate surface is viewed from above, and that each side of the center base portion be arranged at an angle of 45 degrees relative to the outer periphery. In this structure, the length of the second detection-cum-drive beam section extending along the diagonal line of the vibration body is able to be made longer than a case in which the center base portion has a circular shape or a case in which the center base portion has a square or substantially square shape but the sides thereof are arranged parallel with the outer periphery. This makes it possible to further lower the resonant frequency in the drive vibration mode.

It is preferable for the driver to include a piezoelectric element that performs driving and is attached to the plate surface of the vibration body and vibrates the vibration body. In particular, it is preferable that one or more of the piezoelectric elements be included, and that each of the piezoelectric elements is attached to either a position where stress by action of the vibration body due to vibrations of the second detection-cum-drive beam section bending in a direction perpendicular or substantially perpendicular to the diagonal line within the plate surface has a positive polarity or a position where the stress by action of the vibration body has a negative polarity. More specifically, it is preferable to include the piezoelectric element provided at the position where the stress by action of the vibration body has a positive polarity and the piezoelectric element provided at the position where the stress by action of the vibration body has a negative polarity. Since the piezoelectric elements are able to have an extremely thin structure, by vibrating the vibration body with these piezoelectric elements, angular velocities are able to be detected with high precision while maintaining the compactness of the angular velocity detection device.

It is preferable for the detector to include a piezoelectric element that performs detecting and that is attached to the plate surface of the vibration body and detects vibrations of the vibration body. In particular, it is preferable that one or more of the piezoelectric elements that perform detecting be included, and that each of the piezoelectric elements that performs detecting is attached to either a position where stress by action of the vibration body due to vibrations generated in the vibration body by action of an angular velocity has a positive polarity or a position where the stress by action of the vibration body has a negative polarity. More specifically, it is preferable to include the piezoelectric element that performs detecting provided at the position where the stress by action of the vibration body has a positive polarity and the piezoelectric element that performs detecting provided at the position where the stress by action of the vibration body has a negative polarity. Detecting the vibrations of the vibration body by these piezoelectric elements that perform detecting makes it possible to detect angular velocities with high precision while maintaining the compactness of the angular velocity detection device.

It is preferable for the driver to include a piezoelectric element that performs monitoring, that is attached to the plate surface of the vibrator and detects vibrations of the second detection-cum-drive beam section bending in a direction perpendicular or substantially perpendicular to the diagonal line within the plate surface. In particular, it is preferable that one or more of the piezoelectric elements that perform monitoring be included, and that each of the piezoelectric elements that perform monitoring is each attached to either a position where stress by action of the vibration body has a positive polarity or a position where the stress by action of the vibration body has a negative polarity due to vibrations of the second detection-cum-drive beam section bending in a direction perpendicular or substantially perpendicular to the diagonal line within the plate surface. In this structure, the piezoelectric element that performs monitoring detects the drive vibration mode, and with a detection signal thereof, the drive voltage is able to be feedback-controlled. As a result, vibrations in the drive vibration mode are stabilized so that the detection precision of angular velocities is improved. In addition, monitoring the vibrations of the vibration body with the piezoelectric elements that perform monitoring makes it possible to detect the angular velocities with high precision while maintaining the compactness of the angular velocity detection device.

It is preferable for the vibration body to be made of a single base material and for the base material to be formed of a semiconductor wafer. With this structure, a plurality of angular velocity detection devices are cut out after the semiconductor wafer has been surface processed, such that the angular velocity detection devices is efficiently manufactured. Since the processing techniques for shaping semiconductor wafers, performance of the manufacturing apparatuses of semiconductor wafers, and the like are well developed, the angular velocity detection devices are able to be easily manufactured at a high level of precision.

According to various preferred embodiments of the present invention, even with a single angular velocity detection device, output signals corresponding to angular velocities about three axes are able to be outputted, and in addition, the resonant frequency of the drive vibration mode is able to be suppressed even if the outer periphery of the vibration body is made smaller.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, two axes perpendicular or substantially perpendicular to each other along an outer periphery of a vibration body when a plate surface of the vibration body is viewed from above are taken as an X axis and a Y axis of the orthogonal coordinate system, respectively. Further, an axis perpendicular or substantially perpendicular to the plate surface of the vibration body is taken as a Z axis of the orthogonal coordinate system.

Figure 1A:
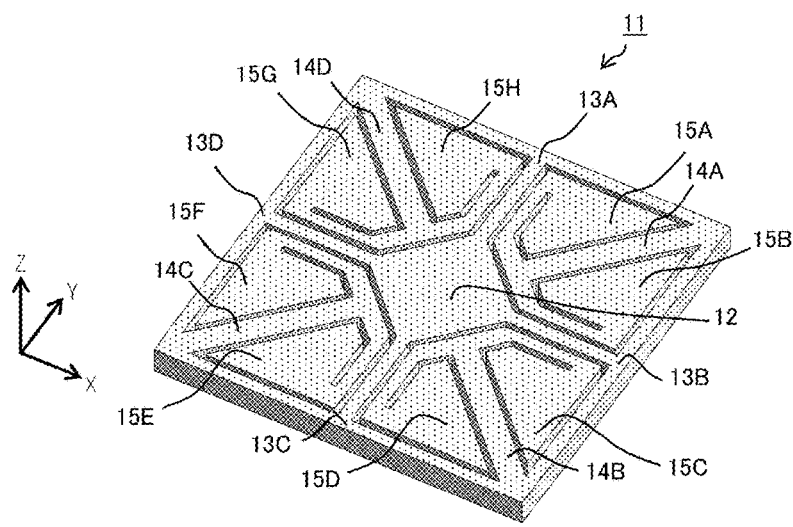
FIGS. 1A and 1B are a perspective view and a plan view of a vibration body of an angular velocity detection device according to a first preferred embodiment of the present invention.

FIG. 1A is a perspective view illustrating a vibration body 11 of an angular velocity detection device 10 according to a first preferred embodiment of the present invention.

The vibration body 11 has a thickness that is uniform or substantially uniform in the Z axis direction and has a square or substantially square outer periphery as a whole when the plate surface is viewed from above along the Z axis direction. Each side of the outer periphery of the vibration body 11 is parallel or substantially parallel to the X or Y axis.

The structure of the angular velocity detection device is such that the vibration body 11 is mounted on a support substrate (not shown) and there are provided a detector and a driver (not shown). It is preferable that the support substrate be made of ceramic, resin, silicon, glass material, or the like, and have a plate surface parallel or substantially parallel to the plate surface of the vibration body 11.

Figure 1B:
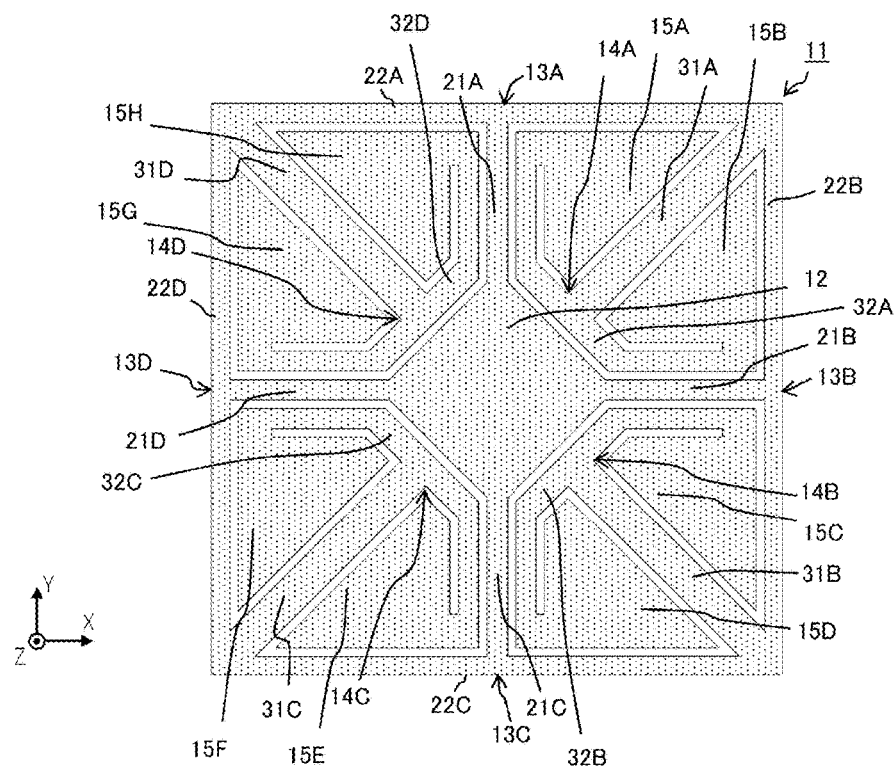

FIG. 1B is an X-Y surface plan view of the vibration body 11.

Respective portions of the vibration body 11 are processed to form a 4-fold rotational symmetry shape through etching on a semiconductor wafer to provide apertures penetrating the wafer in a thickness direction thereof. To be more specific, the vibration body 11 includes a center base portion 12, first detection beam sections 13A, 13B, 13C, and 13D, second detection-cum-drive beam sections 14A, 14B, 14C, and 14D, and mass bodies 15A, 15B, 15C, 15D, 15E, 15F, 15G, and 15H. It is preferable for the vibration body 11 to be manufactured as follows. That is, segments defining a plurality of vibration bodies 11 are formed on a semiconductor silicon wafer at the same time, and the plurality of vibration bodies 11 are cut out from the semiconductor silicon wafer to be divided into each individual vibration body 11.

The center base portion 12 is disposed at the center of the vibration body 11 when the plate surface is viewed from above. Here, the center base portion 12 is formed in a square or substantially square shape including four sides each of which is set at an angle of 45 degrees relative to the X axis and the Y axis. Note that the center base portion 12 may be formed in another shape, and may be formed, for example, in a circular or substantially circular shape, a square or substantially square shape parallel to the outer periphery, a polygonal shape, or the like.

The center base portion 12 specifically includes, within the plate surface, a side perpendicular or substantially perpendicular to an angle direction of 45 degrees clockwise while taking the Y axis positive direction (direction of 0 degree) as a reference angle direction (same applied to the angle directions explained below), a side perpendicular or substantially perpendicular to an angle direction of 135 degrees, a side perpendicular or substantially perpendicular to an angle direction of 225 degrees, and a side perpendicular or substantially perpendicular to an angle direction of 315 degrees. At least one of a surface on the Z axis positive direction side and a surface on the Z axis negative direction side of the center base portion 12 is connected to a support substrate (not shown) and fixed to an external structure via the support substrate. The center base portion 12 supports the first detection beam sections 13A through 13D, the second detection-cum-drive beam sections 14A through 14D, and the mass bodies 15A through 15H in a state in which these are floated from the support substrate.

The first detection beam sections 13A through 13D extend from the center base portion 12 in parallel to the X axis and the Y axis when the plate surface is viewed from above, and each fork into two branches to define a T shape extending in both side directions along each side of the outer periphery of the vibration body 11. The first detection beam sections 13A through 13D are connected to each other at four corners of the outer periphery of the vibration body 11 to define a frame body of the square or substantially square shape. A surface of each of the first detection beam sections 13A through 13D on the Z axis positive or negative direction side opposes a plate surface of the support substrate with a gap interposed therebetween.

More specifically, the first detection beam section 13A includes a base end side beam 21A and a leading end side beam 22A. The base end side beam 21A is connected to a corner of the center base portion 12 facing a direction of 0 degree and extends from the connecting position with the center base portion 12 in a direction parallel or substantially parallel to the Y axis, that is, the direction of 0 degree. The leading end side beam 22A is connected to an end of the base end side beam 21A on the opposite side to the center base portion 12 and extends from the connecting position with the base end side beam 21A in both directions parallel or substantially parallel to the X axis, that is, a direction of 90 degrees and a direction of 270 degrees, so as to be connected to the adjacent first detection beam section 13B and the first detection beam section 13D.

The first detection beam section 13B includes a base end side beam 21B and a leading end side beam 22B. The base end side beam 21B is connected to a corner of the center base portion 12 facing a direction of 90 degree and extends from the connecting position with the center base portion 12 in a direction parallel or substantially parallel to the X axis, that is, the direction of 90 degree. The leading end side beam 22B is connected to an end of the base end side beam 21B on the opposite side to the center base portion 12 and extends from the connecting position with the base end side beam 21B in both directions parallel or substantially parallel to the Y axis, that is, the direction of 0 degree and a direction of 180 degrees, so as to be connected to the adjacent first detection beam section 13A and the first detection beam section 13C.

The first detection beam section 13C includes a base end side beam 21C and a leading end side beam 22C. The base end side beam 21C is connected to a corner of the center base portion 12 facing the direction of 180 degrees and extends from the connecting position with the center base portion 12 in a direction parallel or substantially parallel to the Y axis, that is, the direction of 180 degrees. The leading end side beam 22C is connected to an end of the base end side beam 21C on the opposite side to the center base portion 12 and extends from the connecting position with the base end side beam 21C in both directions parallel or substantially parallel to the X axis, that is, the direction of 90 degrees and a direction of 270 degrees, so as to be connected to the adjacent first detection beam section 13B and the first detection beam section 13D.

The first detection beam section 13D includes a base end side beam 21D and a leading end side beam 22D. The base end side beam 21D is connected to a corner of the center base portion 12 facing the direction of 270 degrees and extends from the connecting position with the center base portion 12 in a direction parallel or substantially parallel to the X axis, that is, the direction of 270 degrees. The leading end side beam 22D is connected to an end of the base end side beam 21D on the opposite side to the center base portion 12 and extends from the connecting position with the base end side beam 21 in both directions parallel or substantially parallel to the Y axis, that is, the direction of 0 degree and the direction of 180 degrees, so as to be connected to the adjacent first detection beam section 13A and the first detection beam section 13C.

The second detection-cum-drive beam sections 14A through 14D extend from the connecting positions where the first detection beam sections 13A through 13D are connected to each other toward the center base portion 12 side along the diagonal lines of the vibration body 11, and each fork into two branches to form a T shape extending along the center base portion 12 as well as the first detection beam sections 13A through 13D. The second detection-cum-drive beam sections 14A through 14D oppose the center base portion 12 and the first detection beam sections 13A through 13D with a constant gap interposed therebetween. A surface of each of the second detection-cum-drive beam sections 14A through 14D on the Z axis positive or negative direction side opposes the plate surface of the support substrate with a gap interposed therebetween.

To be more specific, the second detection-cum-drive beam section 14A includes a base end side beam 31A and a leading end side beam 32A. The base end side beam 31A is arranged at a direction of 45 degrees of the center base portion 12, and extends from the connecting position of the first detection beam section 13A and the first detection beam section 13B toward the center base portion 12 side along the diagonal line of the vibration body 11.

The second detection-cum-drive beam section 14B includes a base end side beam 31B and a leading end side beam 32B. The base end side beam 31B is arranged at a direction of 135 degrees of the center base portion 12, and extends from the connecting position of the adjacent first detection beam section 13B and the adjacent first detection beam section 13C toward the center base portion 12 side along the diagonal line of the vibration body 11.

The second detection-cum-drive beam section 14C includes a base end side beam 31C and a leading end side beam 32C. The base end side beam 31C is arranged at a direction of 225 degrees of the center base portion 12, and extends from the connecting position of the first detection beam section 13C and the first detection beam section 13D toward the center base portion 12 side along the diagonal line of the vibration body 11.

The second detection-cum-drive beam section 14D includes a base end side beam 31D and a leading end side beam 32D. The base end side beam 31D is arranged at a direction of 315 degrees of the center base portion 12, and extends from the connecting position of the first detection beam section 13D and the first detection beam section 13A toward the center base portion 12 side along the diagonal line of the vibration body 11.

Further, the leading end side beam 32A of the second detection-cum-drive beam section 14A forks into two branches from an end of the base end side beam 31A on the center base portion 12 side in both directions perpendicular or substantially perpendicular to the base end side beam 31A so as to extend along the center base portion 12 as well as the base end side beams 21A and 21B of the first detection beam sections 13A and 13B, respectively. Both ends of the leading end side beam 32A reach the positions near the leading end side beams 22A and 22B of the first detection beam sections 13A and 13B, respectively.

The leading end side beam 32B of the second detection-cum-drive beam section 14B forks into two branches from an end of the base end side beam 31B on the center base portion 12 side in both directions perpendicular or substantially perpendicular to the base end side beam 31B so as to extend along the center base portion 12 as well as the base end side beams 21B and 21C of the first detection beam sections 13B and 13C, respectively. Both ends of the leading end side beam 32B reach the positions near the leading end side beams 22B and 22C of the first detection beam sections 13B and 13C, respectively.

The leading end side beam 32C of the second detection-cum-drive beam section 14C forks into two branches from an end of the base end side beam 31C on the center base portion 12 side in both directions perpendicular or substantially perpendicular to the base end side beam 31C so as to extend along the center base portion 12 as well as the base end side beams 21C and 21D of the first detection beam sections 13C and 13D, respectively. Both ends of the leading end side beam 32C reach the positions near the leading end side beams 22C and 22D of the first detection beam sections 13C and 13D, respectively.

The leading end side beam 32D of the second detection-cum-drive beam section 14D forks into two branches from an end of the base end side beam 31D on the center base portion 12 side in both directions perpendicular or substantially perpendicular to the base end side beam 31D so as to extend along the center base portion 12 as well as the base end side beams 21D and 21A of the first detection beam sections 13D and 13A, respectively. Both ends of the leading end side beam 32D reach the positions near the leading end side beams 22D and 22A of the first detection beam sections 13D and 13A, respectively.

The mass body 15A is connected to an end of the second detection-cum-drive beam section 14A extended along the first detection beam section 13A. The mass body 15A occupies most of the area surrounded by the second detection-cum-drive beam section 14A and the first detection beam section 13A and opposes the second detection-cum-drive beam section 14A and the first detection beam section 13A with a constant gap interposed therebetween excluding the connecting position with the second detection-cum-drive beam section 14A.

The mass body 15B is connected to an end of the second detection-cum-drive beam section 14A extended along the first detection beam section 13B. The mass body 15B occupies most of the area surrounded by the second detection-cum-drive beam section 14A and the first detection beam section 13B and opposes the second detection-cum-drive beam section 14A and the first detection beam section 13B with a constant gap interposed therebetween excluding the connecting position with the second detection-cum-drive beam section 14A.

The mass body 15C is connected to an end of the second detection-cum-drive beam section 14B extended along the first detection beam section 13B. The mass body 15C occupies most of the area surrounded by the second detection-cum-drive beam section 14B and the first detection beam section 13B and opposes the second detection-cum-drive beam section 14B and the first detection beam section 13B with a constant gap interposed therebetween excluding the connecting position with the second detection-cum-drive beam section 14B.

The mass body 15D is connected to an end of the second detection-cum-drive beam section 14B extended along the first detection beam section 13C. The mass body 15D occupies most of the area surrounded by the second detection-cum-drive beam section 14B and the first detection beam section 13C and opposes the second detection-cum-drive beam section 14B and the first detection beam section 13C with a constant gap interposed therebetween excluding the connecting position with the second detection-cum-drive beam section 14B.

The mass body 15E is connected to an end of the second detection-cum-drive beam section 14C extended along the first detection beam section 13C. The mass body 15E occupies most of the area surrounded by the second detection-cum-drive beam section 14C and the first detection beam section 13C and opposes the second detection-cum-drive beam section 14C and the first detection beam section 13C with a constant gap interposed therebetween excluding the connecting position with the second detection-cum-drive beam section 14C.

The mass body 15F is connected to an end of the second detection-cum-drive beam section 14C extended along the first detection beam section 13D. The mass body 15F occupies most of the area surrounded by the second detection-cum-drive beam section 14C and the first detection beam section 13D and opposes the second detection-cum-drive beam section 14C and the first detection beam section 13D with a constant gap interposed therebetween excluding the connecting position with the second detection-cum-drive beam section 14C.

The mass body 15G is connected to an end of the second detection-cum-drive beam section 14D extended along the first detection beam section 13D. The mass body 15G occupies most of the area surrounded by the second detection-cum-drive beam section 14D and the first detection beam section 13D and opposes the second detection-cum-drive beam section 14D and the first detection beam section 13D with a constant gap interposed therebetween excluding the connecting position with the second detection-cum-drive beam section 14D.

The mass body 15H is connected to an end of the second detection-cum-drive beam section 14D extended along the first detection beam section 13A. The mass body 15H occupies most of the area surrounded by the second detection-cum-drive beam section 14D and the first detection beam section 13A and opposes the second detection-cum-drive beam section 14D and the first detection beam section 13A with a constant gap interposed therebetween excluding the connecting position with the second detection-cum-drive beam section 14D.

In the vibration body 11 having the unique structure described above, the center base portion 12 is provided at the center of the outer periphery when the plate surface is viewed from above, and the second detection-cum-drive beam sections 14A through 14D are extended from the corner portions of the outer periphery of the vibration body 11 toward the center base portion 12 side so as to be located along the diagonal lines of the vibration body 11. Therefore, a sufficient length of each of the second detection-cum-drive beam sections 14A through 14D along the diagonal lines of the vibration 11 is able to be secured even if the outer periphery of the vibration body 11 is made smaller. Further, each side of the center base portion 12 is arranged at an angle of 45 degrees relative to the outer periphery of the vibration body 11, such that the lengths of the second detection-cum-drive beam sections 14A through 14D along the diagonal lines of the vibration body 11 are able to be made longer. As such, it is possible to suppress a resonant frequency of a vibration mode that causes each of the second detection-cum-drive beam sections 14A through 14D to perform flexural vibration within the plate surface in a direction perpendicular or substantially perpendicular to the diagonal line of the vibration body 11.

Here, the explanation on vibration modes of the vibration body 11 will be given. The vibration body 11 includes, as the vibration modes, a drive vibration mode excited by a driver to be explained later, a first detection vibration mode generated by action of a Coriolis force due to an angular velocity about the X axis, a second detection vibration mode generated by action of a Coriolis force due to an angular velocity about the Y axis, and a third detection vibration mode generated by action of a Coriolis force due to an angular velocity about the Z axis.

Figure 2A:
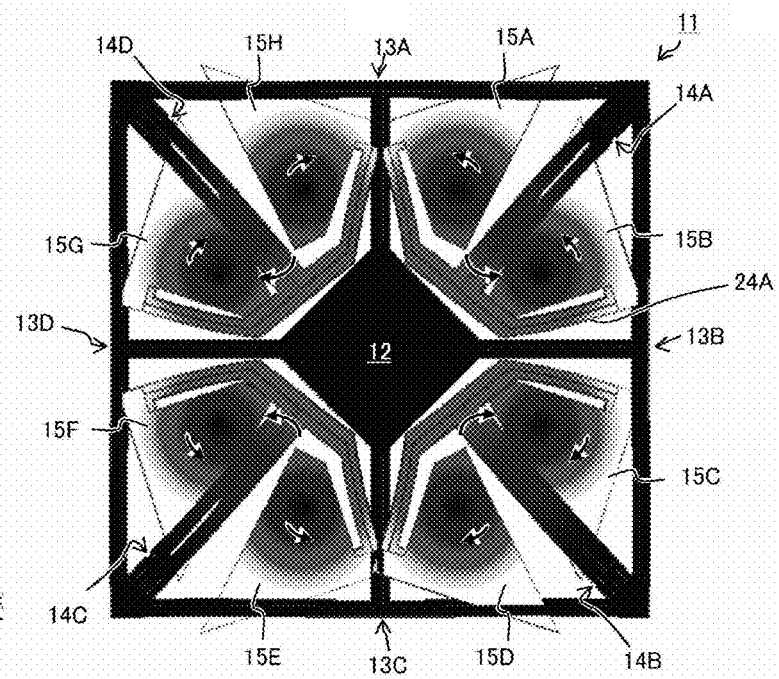
FIGS. 2A and 2B are plan views illustrating a drive vibration mode of the vibration body according to the first preferred embodiment of the present invention.
Figure 2B:
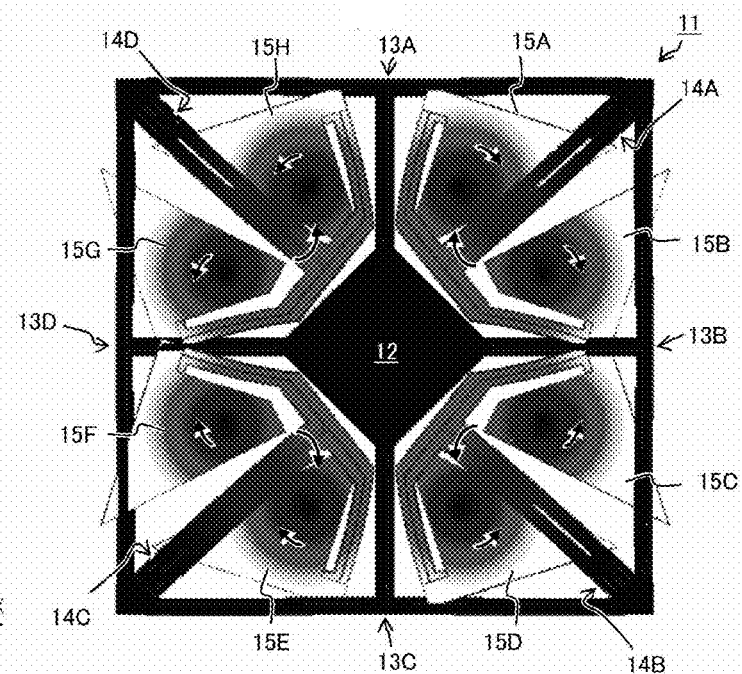

FIGS. 2A and 2B are contour figures of an X-Y surface of the vibration body 11 illustrating a deforming manner in the drive vibration mode. Vibration phases in FIGS. 2A and 2B are different from each other by 180 degrees. Note that in FIGS. 2A and 2B, amounts of deformation of respective portions are displayed larger than the actual amounts thereof; and further in FIGS. 2A and 2B, the larger the amount of deformation from the not-deformed state is, the thinner the contour display density is at the corresponding position.

In the angular velocity detection device 10, the drive vibration mode is excited in the vibration body 11 by a driver to be explained later. In the drive vibration mode, the second detection-cum-drive beam sections 14A through 14D perform flexural vibration in a first-order mode taking the connecting positions with the first detection beam sections 13A through 13D as fulcrums so as to vibrate within the X-Y surface. In other words, the second detection-cum-drive beam sections 14A through 14D each perform flexural vibration within the plate surface in a direction perpendicular or substantially perpendicular to the diagonal line of the vibration body 11. Of the second detection-cum-drive beam sections 14A through 14D, the beam sections adjacent to each other perform flexural vibration so as to vibrate in reverse rotational directions to each other (see arrows in FIGS. 2A and 2B).

As a result, a centrifugal force acts on the mass bodies 15A through 15H connected to the second detection-cum-drive beam sections 14A through 14D. With this, one end sides of the leading end side beams 32A through 32D bend so as to be distanced from or close to the base end side beams 31A through 31D in the second detection-cum-drive beam sections 14A through 14D. At the same time, the other end sides of the leading end side beams 32A through 32D bend so as to be close to or distanced from the base end side beams 31A through 31D in the opposite manner to those of the one end sides of the leading end side beams 32A through 32D.

In addition, the mass bodies 15A through 15H connected to the one end sides of the leading end side beams 32A through 32D move so as to be distanced from or close to the leading end side beams 32A through 32D. At the same time, the mass bodies 15A through 15H connected to the other end sides of the leading end side beams 32A through 32D move so as to be close to or distanced from the leading end side beams 32A through 32D in the opposite manner to those of the mass bodies 15A through 15H connected to the one end sides thereof.

With this, the mass bodies 15A through 15H each vibrate so as to rotate while taking a point overlapping with the corresponding mass body as a rotational center. The center of gravity (driving mass) of each of the mass bodies 15A through 15H is positioned at an outer side portion of the rotational center of the mass bodies 15A through 15H when viewed from the center of the vibration body 11, and moves in a direction that substantially matches a circumferential direction when viewed from the center of the vibration body 11 (see arrows in FIGS. 2A and 2B).

Of the mass bodies 15A through 15H, the mass bodies connected to the same second detection-cum-drive beam sections 14A through 14D are such that the center of gravity (driving mass) thereof moves in the same direction, while the mass bodies connected to the adjacent second detection-cum-drive beam sections 14A through 14D are such that the center of gravity (driving mass) thereof moves in the reverse directions to each other.

The drive vibration mode having the above-described vibrating characteristics provides a resonant frequency in accordance with the lengths of the second detection-cum-drive beam sections 14A through 14D extending along the diagonal lines of the vibration body 11. As discussed above, the vibration body is able to secure sufficiently long lengths of the second detection-cum-drive beam sections 14A through 14D extending along the diagonal lines of the vibration body 11 even if the outer periphery is made smaller, such that the resonant frequency of the drive vibration mode is able to be suppressed (lowered).

Next, the explanation will be given on the first detection vibration mode that is generated by action of a Coriolis force when an angular velocity about the X axis acts on the vibration body 11 vibrating in the drive vibration mode.

Figure 3:
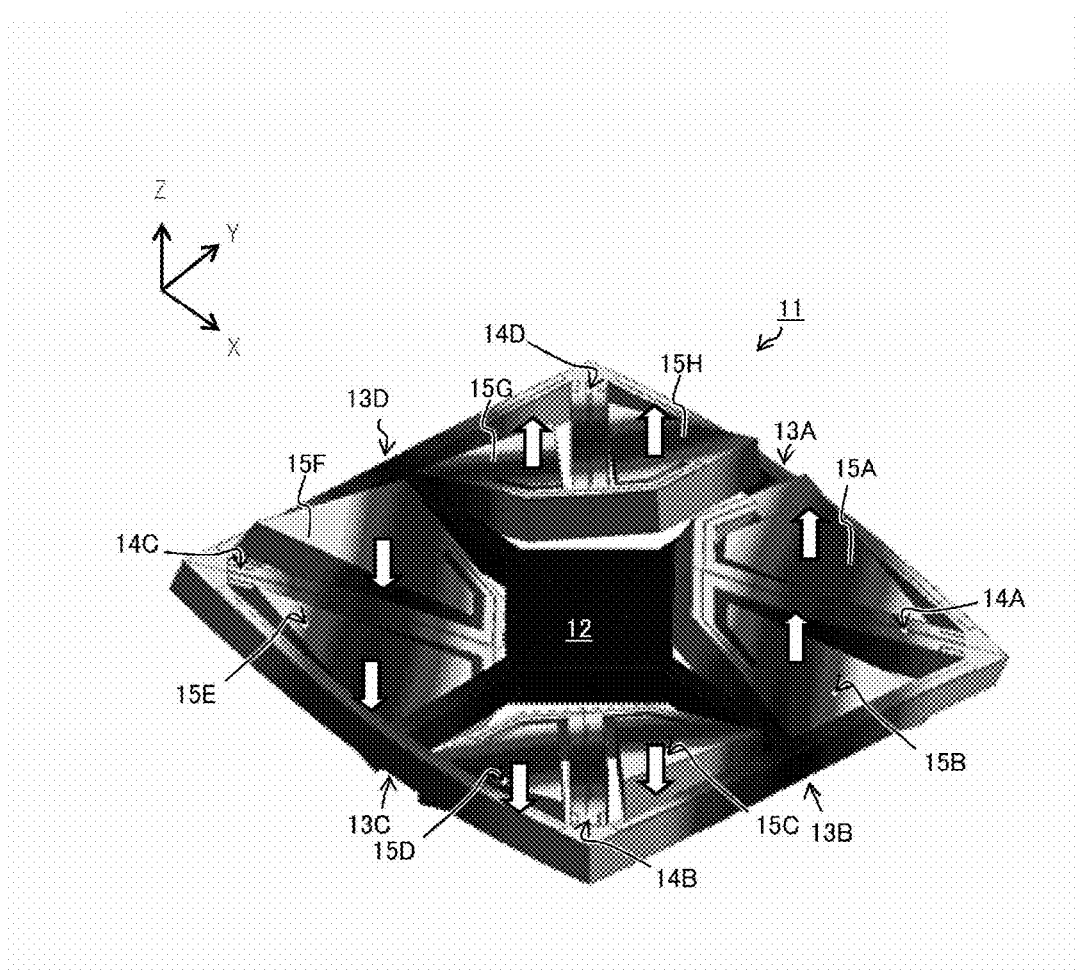
FIG. 3 is a perspective view illustrating a vibrating manner of the vibration body according to the first preferred embodiment of the present invention in a first detection vibration mode.

FIG. 3 is a contour figure of the X-Y surface of the vibration body 11 illustrating a deforming manner in the first detection vibration mode. Note that in FIG. 3, amounts of deformation of respective portions are displayed larger than the actual amounts thereof; and further in FIG. 3, the larger the amount of deformation from the not-deformed state is, the thinner the display density is at the corresponding position. White arrows in FIG. 3 indicate directions in which Coriolis forces act.

In the case where an angular velocity about the X axis acts on the vibration body 11 vibrating in the drive vibration mode, a Coriolis force acts on the center of gravity (driving mass) of the mass bodies 15A through 15H in an action direction along the Z axis. With this Coriolis force, vibrations in the first detection vibration mode are excited in the vibration body 11.

More specifically, the mass bodies 15A, 15B, 15G, and 15H positioned on one side with respect to the X axis are distanced from the X axis in the Y axis direction in the drive vibration mode, or move in the same direction along the Z axis because they move in sync with one another to be close to the X axis making Coriolis forces act in the same direction. Likewise, the mass bodies 15C, 15D, 15E, and 15F positioned on the other side with respect to the X axis are distanced from the X axis in the Y axis direction in the drive vibration mode, or move in the same direction along the Z axis because they move in sync with one another to be close to the X axis making Coriolis forces act in the same direction. Because the moving direction of the mass bodies 15A, 15B, 15G, and 15H is opposite to that of the mass bodies 15C, 15D, 15E, and 15F in the Y axis direction, the Coriolis forces acting in the Z axis direction are accordingly opposite to each other.

Due to this, the second detection-cum-drive beam sections 14A and 14D bend together in the same direction along the Z axis, the second detection-cum-drive beam sections 14B and 14C bend together in the same direction along the Z axis, and the second detection-cum-drive beam sections 14A, 14D and the second detection-cum-drive beam sections 14B, 14C bend in the opposite directions to each other along the Z axis. As a result, torque acts from the second detection-cum-drive beam sections 14A through 14D on the four corners of the frame body where the first detection beam sections 13A through 13D are connected, such forces are applied to the first detection beam section 13A positioned on the one side with respect to the X axis and the first detection beam section 13C positioned on the other side with respect to the X axis that cause the leading end side beams 22A and 22C to bend in the opposite directions to each other along the Z axis, and the leading end side beams 22A and 22C then vibrate along the Z axis.

In this vibration manner, vibrations in the first detection vibration mode are excited in the vibration body 11. Because the first detection beam sections 13A, 13C, which do not vibrate in either the drive vibration mode or other detection vibration modes, vibrate in the first detection vibration mode, vibrations in the first detection vibration mode are able to be detected by detecting the vibrations of the first detection beam sections 13A and 13C with a detector to be explained later without detecting vibrations in the drive vibration mode or other detection vibration modes. Further, the first detection beam sections 13A and 13C vibrate in the first-order mode, which improves detection sensitivity to the vibrations in the first detection vibration mode.

Next, the explanation will be given on the second detection vibration mode that is generated by action of a Coriolis force when an angular velocity about the Y axis acts on the vibration body 11 vibrating in the drive vibration mode.

Figure 4:
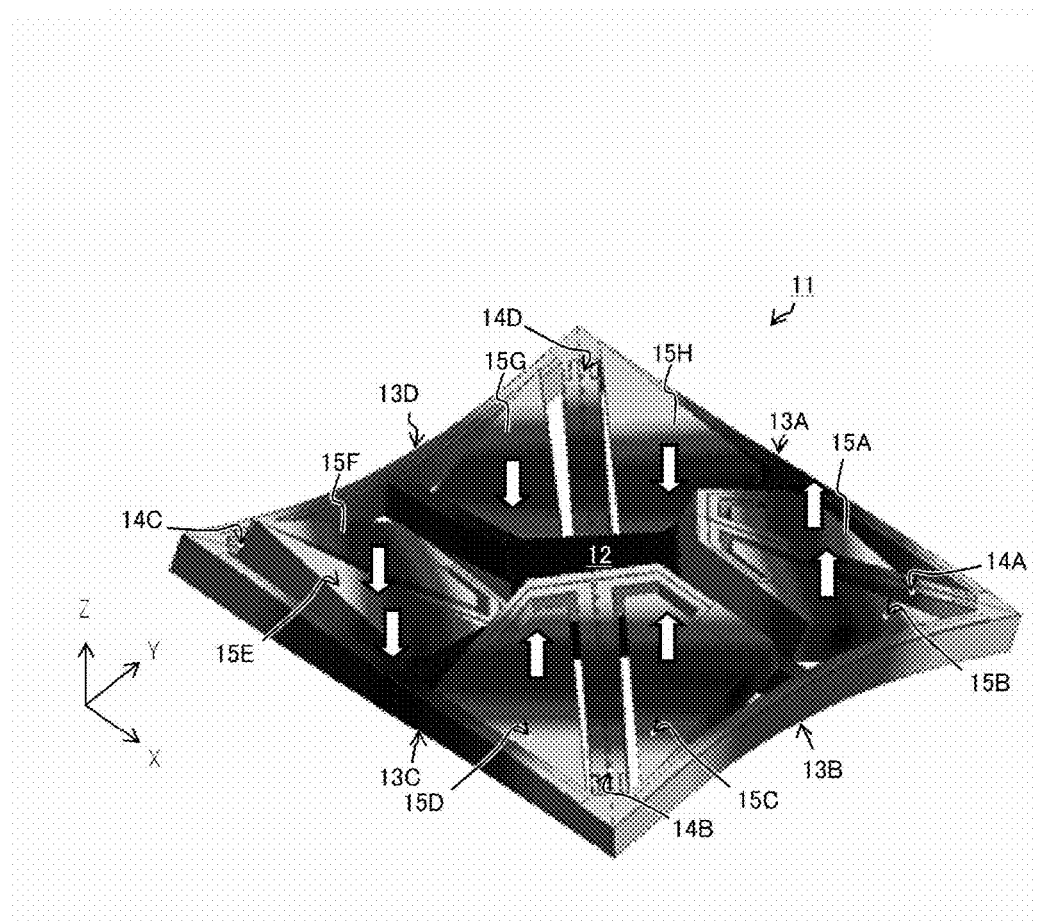
FIG. 4 is a perspective view illustrating a vibrating manner of the vibration body according to the first preferred embodiment of the present invention in a second detection vibration mode.

FIG. 4 is a contour figure of the X-Y surface of the vibration body 11 illustrating a deforming manner in the second detection vibration mode. Note that in FIG. 4, amounts of deformation of respective portions are displayed larger than the actual amounts thereof; and further in FIG. 4, the larger the amount of deformation from the not-deformed state is, the thinner the display density is at the corresponding position. White arrows in FIG. 4 indicate directions in which Coriolis forces act.

In the case where an angular velocity about the Y axis along the plate surface acts on the vibration body 11 vibrating in the drive vibration mode, a Coriolis force acts on the center of gravity (driving mass) of the mass bodies 15A through 15H in an action direction along the Z axis. With this Coriolis force, vibrations in the second detection vibration mode are excited in the vibration body 11.

More specifically, the mass bodies 15A, 15B, 15C, and 15D positioned on one side with respect to the Y axis are distanced from the Y axis in the X axis direction in the drive vibration mode, or move in the same direction along the Z axis because they move in sync with one another to be close to the Y axis making Coriolis forces act in the same direction. Likewise, the mass bodies 15E, 15F, 15G, and 15H positioned on the other side with respect to the Y axis are distanced from the Y axis in the X axis direction in the drive vibration mode, or move in the same direction along the Z axis because they move in sync with one another to be close to the Y axis making Coriolis forces act in the same direction. Because the moving direction of the mass bodies 15A, 15B, 15C, and 15D is opposite to that of the mass bodies 15E, 15F, 15G, and 15H in the X axis direction, the Coriolis forces acting in the Z axis direction are accordingly opposite to each other.

Due to this, the second detection-cum-drive beam sections 14A and 14B bend together in the same direction along the Z axis, the second detection-cum-drive beam sections 14C and 14D bend together in the same direction along the Z axis, and the second detection-cum-drive beam sections 14A, 14B and the second detection-cum-drive beam sections 14C, 14D bend in the opposite directions to each other along the Z axis. As a result, torque acts from the second detection-cum-drive beam sections 14A through 14D on the four corners of the frame body where the first detection beam sections 13A through 13D are connected, such forces are applied to the first detection beam section 13B positioned on the one side of the Y axis and the first detection beam section 13D positioned on the other side of the Y axis that cause the leading end side beams 22B and 22D to bend in the opposite directions to each other along the Z axis, and the leading end side beams 22B and 22D then vibrate along the Z axis.

In this vibration manner, vibrations in the second detection vibration mode are excited in the vibration body 11. Because the first detection beam sections 13B, 13D, which do not vibrate in either the drive vibration mode or other detection vibration modes, vibrate in the second detection vibration mode, vibrations in the second detection vibration mode are able to be detected by detecting the vibrations of the first detection beam sections 13B and 13D with a detector to be explained later without detecting vibrations in the drive vibration mode or other detection vibration modes. Further, the first detection beam sections 13B and 13D vibrate in the first-order mode, which improves detection sensitivity to the vibrations in the second detection vibration mode.

Next, the explanation will be given on the third detection vibration mode that is generated by action of a Coriolis force when an angular velocity about the Z axis acts on the vibration body 11 vibrating in the drive vibration mode.

Figure 5:
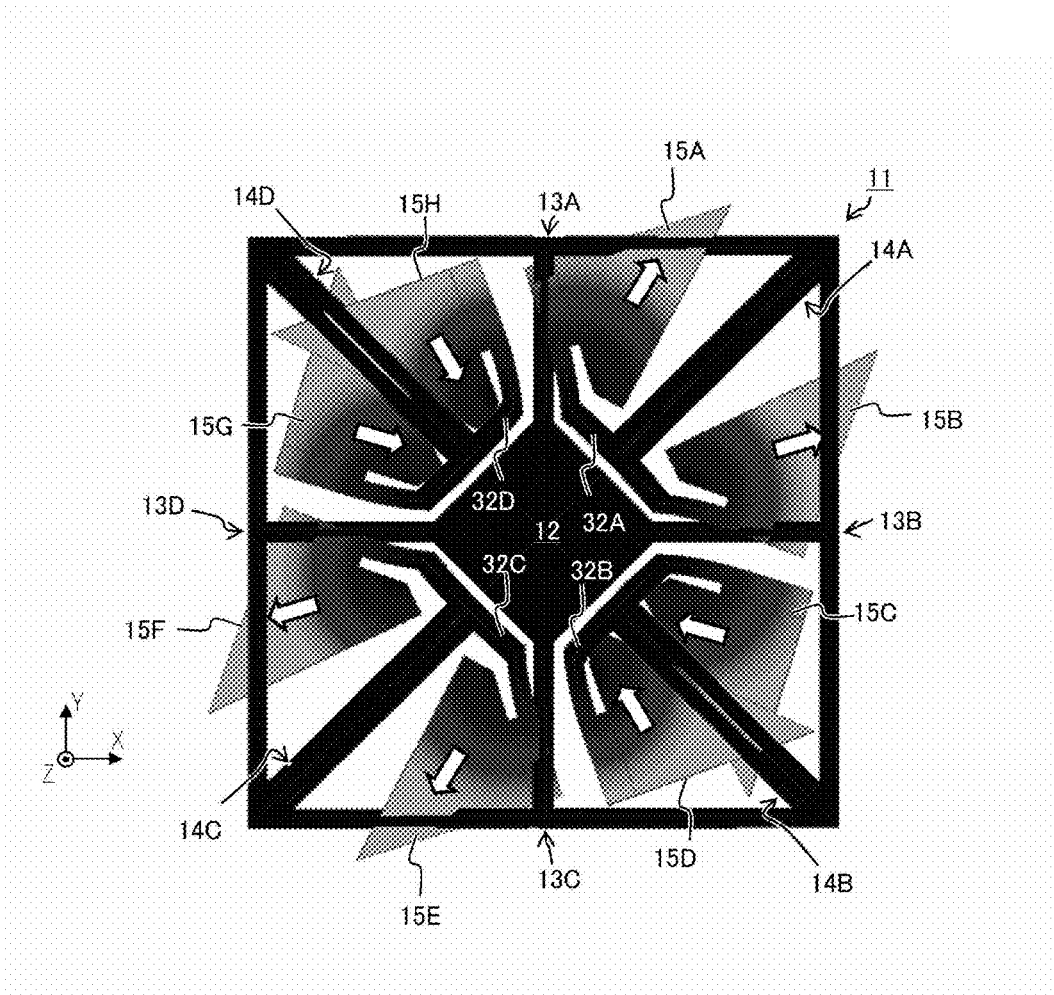
FIG. 5 is a plan view illustrating a vibrating manner of the vibration body according to the first preferred embodiment of the present invention in a third detection vibration mode.

FIG. 5 is a contour figure of the X-Y surface of the vibration body 11 illustrating a deforming manner in the third detection vibration mode. Note that in FIG. 5, amounts of deformation of respective portions are displayed larger than the actual amounts thereof; and further in FIG. 5, the larger the amount of deformation from the not-deformed state is, the thinner the display density is at the corresponding position. White arrows in FIG. 5 indicate directions in which Coriolis forces act.

In the case where an angular velocity about the Z axis perpendicular or substantially perpendicular to the plate surface acts on the vibration body 11 vibrating in the drive vibration mode, a Coriolis force acts on the center of gravity (driving mass) of the mass bodies 15A through 15H along a radiation direction centered at the center base portion 12. With this Coriolis force, vibrations in the third detection vibration mode are excited in the vibration body 11.

More specifically, to the mass bodies 15A, 15B, 15E, and 15F moving in the same direction about the Z axis in the drive vibration mode, Coriolis forces are applied in the radiation direction facing an outer side or an inner side in a synchronized manner, so that these mass bodies move in the same direction, that is, the radiation direction facing the outer side or the inner side. Likewise, to the mass bodies 15C, 15D, 15G, and 15H moving in the same direction about the Z axis in the drive vibration mode, Coriolis forces are applied in the radiation direction facing an outer side or an inner side in a synchronized manner, so that these mass bodies move in the same direction, that is, the radiation direction facing the outer side or the inner side. Because the moving direction of the mass bodies 15A, 15B, 15E, and 15F is opposite to that of the mass bodies 15C, 15D, 15G, and 15H about the Z axis in the drive vibration mode, the Coriolis forces acting in the radiation direction facing the outer side or the inner side are accordingly opposite to each other.

Due to this, in the second detection-cum-drive beam sections 14A through 14D connected to the mass bodies 15A through 15H, respectively, the mass bodies 15A through 15H connected to both sides of each of the leading end side beams 32A through 32D are distanced from the leading end side beams 32A through 32D, or move to be close thereto in sync with one another. As a result, the leading end side beams 32A through 32D bend in a direction along the diagonal line of the vibration body 11.

In this vibration manner, vibrations in the third detection vibration mode are excited in the vibration body 11. Because the vibrations generated in the third detection vibration mode in which the second detection-cum-drive beam section 14A through 14D bend in a direction along the diagonal line of the vibration body 11 are not generated in the drive vibration mode or other detection vibration modes, vibrations in the third detection vibration mode are able to be detected by detecting the vibrations of the second detection beam sections 14 through 14D bending in a direction along the diagonal line of the vibration body 11 with a detector to be explained later without detecting vibrations in the drive vibration mode or other detection vibration modes.

The vibration body 11 is able to be vibrated in the above-discussed vibration modes. The vibrations generated in the vibration body 11 in the drive vibration mode shown in FIGS. 2A and 2B are vibrations in which the second detection-cum-drive beam sections 14A through 14D bend within the plate surface in a direction perpendicular or substantially perpendicular to the diagonal line of the vibration body 11, and such vibrations are not generated in any of the first detection vibration mode, the second detection vibration mode, and the third detection vibration mode. As such, the first through third detection vibration modes generated in the vibration body 11 are independent of the drive vibration mode as well. Because of this, from the vibration body 11, vibrations in the detection vibration mode corresponding to an action axis of the angular velocity are able to be isolated and detected, such that detection signals corresponding to angular velocities about the three axes are able to be outputted with the single vibration body 11. In addition, in this vibration body 11, the lengths of the second detection-cum-drive beam sections 14A through 14D extending along the diagonal lines of the vibration body 11 are able to be secured to be sufficiently long even if the outer periphery is made smaller, which makes it possible to suppress (lower) the resonant frequency of the drive vibration mode and realize high-sensitive detection characteristics.

Next, a detector and a driver of the angular velocity detection device 10 will be described. In the angular velocity detection device 10 according to the first preferred embodiment, the driver and detector preferably include piezoelectric elements. Note that the driver, the detector, or the like may include, aside from the structure using the piezoelectric elements, a structure in which the vibration body 11 is vibrated by an electrostatic force, a structure in which vibrations of the vibration body 11 are detected base on a change in electrostatic capacitance, or the like.

Figure 6:
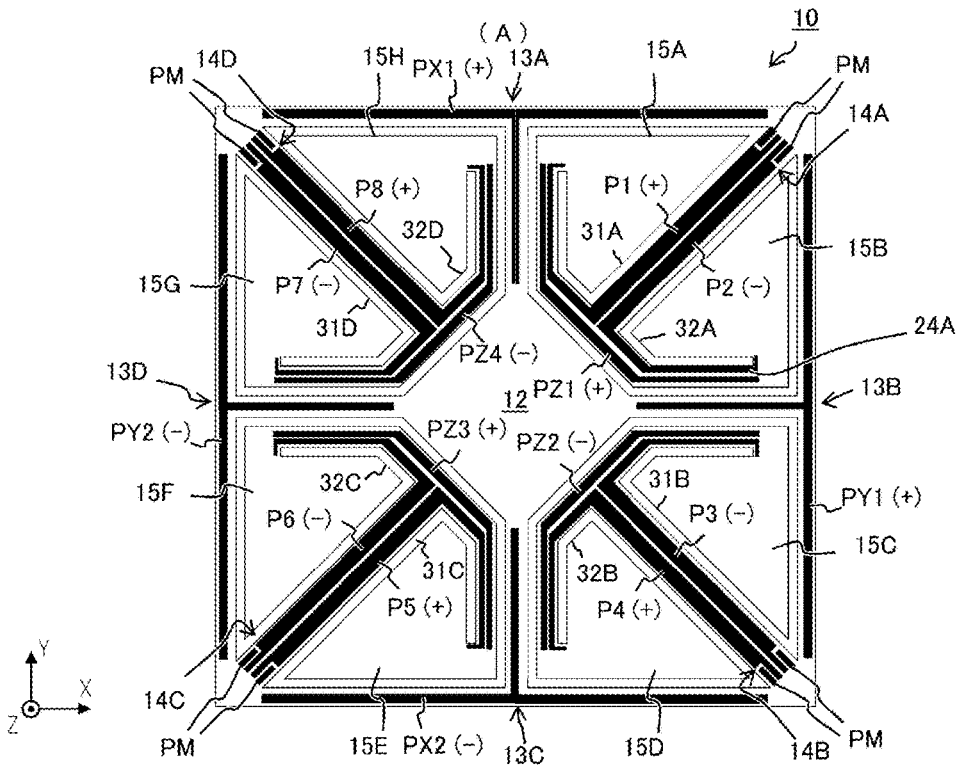
FIG. 6 is a plan view illustrating arrangement of piezoelectric elements of the angular velocity detection device according to the first preferred embodiment of the present invention.

FIG. 6 is an X-Y surface plan view of the angular velocity detection device 10.

The angular velocity detection device 10 includes piezoelectric elements that perform detecting PX1, PX2, PY1, PY2, PZ1, PZ2, PZ3, and PZ4, piezoelectric elements that perform driving P1, P2, P3, P4, P5, P6, P7, and P8, and piezoelectric elements that perform monitoring PM.

The piezoelectric elements PX1 and PX2, PY1 and PY2, PZ1 through PZ4, P1 through P8, and PM are provided on the plate surface of the vibration body 11, and each includes an upper electrode, a lower electrode, and a piezoelectric layer. The piezoelectric layer is a thin film made of any one of piezoelectric materials including aluminum nitride, lead zirconate titanate (PZT), potassium sodium niobate, zinc oxide, and the like. The upper and lower electrodes are each made of, for example, titanium, gold, palladium, iridium, an alloy of these metals, or the like. The lower electrode is connected to the ground provided on a lower surface of the piezoelectric layer. The upper electrode is connected to a circuit section (not shown) through a wiring electrode and a land electrode provided on an upper surface of the piezoelectric layer. Note that the wiring electrode and the land electrode may be defined by a single electrode or defined by a piezoelectric element including a piezoelectric layer. Further, the lower electrode may not be provided in the case where the vibration body is conductive.

The piezoelectric elements that perform driving P1 through P8 are attached to the second detection-cum-drive beam sections 14A through 14D. The piezoelectric elements that perform driving P1, P4, P5, and P8 and the piezoelectric elements that perform driving P2, P3, P6, and P7, when AC voltages that are set to have the same amplitude and reverse phases to each other are applied thereto, expand/contract to bend the second detection-cum-drive beam sections 14A through 14D within the plate surface in a direction perpendicular or substantially perpendicular to the diagonal line of the vibration body 11 and cause the vibration body 11 to vibrate in the drive vibration mode.

The piezoelectric elements that perform driving P1 and P2 are provided in the second detection-cum-drive beam section 14A and are matched with a polarity of strain within a plate surface of the second detection-cum-drive beam section 14A in the drive vibration mode. To rephrase, the piezoelectric elements that perform driving P1 and P2 are each provided in an area of the second detection-cum-drive beam section 14A where the polarity of stress by action of the second detection-cum-drive beam section 14A due to the flexural vibrations within the plate surface of the second detection-cum-drive beam section 14A in a direction perpendicular or substantially perpendicular to the diagonal line of the vibration body 11 becomes a single one. With this, in the case where the piezoelectric elements that perform driving P1 and P2 are driven and expand/contract in a lengthwise direction, the second detection-cum-drive beam section 14A efficiently bends within the plate surface.

Specifically, in the base end side beam 31A, the piezoelectric element that performs driving P1 is provided in an area positioned on the mass body 15A side relative to the center of the base end side beam 31A in the width direction thereof. In the leading end side beam 32A, the piezoelectric element that performs driving P1 is provided in an area positioned on the mass body 15A side relative to the center of the leading end side beam 32A in the width direction thereof extending from the connecting position with the base end side beam 31A to the connecting position with the mass body 15A. Further, in the base end side beam 31A, the piezoelectric element that performs driving P2 is provided in an area positioned on the mass body 15B side relative to the center of the base end side beam 31A in the width direction thereof. In the leading end side beam 32A, the piezoelectric element that performs driving P2 is provided in an area positioned on the mass body 15B side relative to the center of the leading end side beam 32A in the width direction thereof extending from the connecting position with the base end side beam 31A to the connecting position with the mass body 15B.

The piezoelectric elements that perform driving P3 and P4 are provided in the second detection-cum-drive beam section 14B and are matched with a polarity of strain within a plate surface of the second detection-cum-drive beam section 14B in the drive vibration mode. To rephrase, the piezoelectric elements that perform driving P3 and P4 are each provided in an area of the second detection-cum-drive beam section 14B where the polarity of stress by action of the second detection-cum-drive beam section 14B due to the flexural vibrations within the plate surface of the second detection-cum-drive beam section 14B in a direction perpendicular or substantially perpendicular to the diagonal line of the vibration body 11 becomes a single one. With this, in the case where the piezoelectric elements that perform driving P3 and P4 are driven and expand/contract in the lengthwise direction, the second detection-cum-drive beam section 14B efficiently bends within the plate surface.

Specifically, in the base end side beam 31B, the piezoelectric element that performs driving P3 is provided in an area positioned on the mass body 15C side relative to the center of the base end side beam 31B in the width direction thereof. In the leading end side beam 32B, the piezoelectric element that performs driving P3 is provided in an area positioned on the mass body 15C side relative to the center of the leading end side beam 32B in the width direction thereof extending from the connecting position with the base end side beam 31B to the connecting position with the mass body 15C. Further, in the base end side beam 31B, the piezoelectric element that performs driving P4 is provided in an area positioned on the mass body 15D side relative to the center of the base end side beam 31B in the width direction thereof. In the leading end side beam 32B, the piezoelectric element that performs driving P4 is provided in an area positioned on the mass body 15D side relative to the center of the leading end side beam 32B in the width direction thereof extending from the connecting position with the base end side beam 31B to the connecting position with the mass body 15D.

The piezoelectric elements that perform driving P5 and P6 are provided in the second detection-cum-drive beam section 14C and are matched with a polarity of strain within a plate surface of the second detection-cum-drive beam section 14C in the drive vibration mode. To rephrase, the piezoelectric elements that perform driving P5 and P6 are each provided in an area of the second detection-cum-drive beam section 14C where the polarity of stress by action of the second detection-cum-drive beam section 14C due to the flexural vibrations within the plate surface of the second detection-cum-drive beam section 14C in a direction perpendicular or substantially perpendicular to the diagonal line of the vibration body 11 becomes a single one. With this, in the case where the piezoelectric elements that perform driving P5 and P6 are driven and expand/contract in the lengthwise direction, the second detection-cum-drive beam section 14C efficiently bends within the plate surface.

Specifically, in the base end side beam 31C, the piezoelectric element that performs driving P5 is provided in an area positioned on the mass body 15E side relative to the center of the base end side beam 31C in the width direction thereof. In the leading end side beam 32C, the piezoelectric element that performs driving P5 is provided in an area positioned on the mass body 15E side relative to the center of the leading end side beam 32C in the width direction thereof extending from the connecting position with the base end side beam 31C to the connecting position with the mass body 15E. Further, in the base end side beam 31C, the piezoelectric element that performs driving P6 is provided in an area positioned on the mass body 15F side relative to the center of the base end side beam 31C in the width direction thereof. In the leading end side beam 32C, the piezoelectric element that performs driving P6 is provided in an area positioned on the mass body 15F side relative to the center of the leading end side beam 32C in the width direction thereof extending from the connecting position with the base end side beam 31C to the connecting position with the mass body 15F.

The piezoelectric elements that perform driving P7 and P8 are provided in the second detection-cum-drive beam section 14D and are matched with a polarity of strain within a plate surface of the second detection-cum-drive beam section 14D in the drive vibration mode. To rephrase, the piezoelectric elements that perform driving P7 and P8 are each provided in an area of the second detection-cum-drive beam section 14D where the polarity of stress by action of the second detection-cum-drive beam section 14D due to the flexural vibrations within the plate surface of the second detection-cum-drive beam section 14D in a direction perpendicular or substantially perpendicular to the diagonal line of the vibration body 11 becomes a single one. With this, in the case where the piezoelectric elements that perform driving P7 and P8 are driven and expand/contract in the lengthwise direction, the second detection-cum-drive beam section 14D efficiently bends within the plate surface.

Specifically, in the base end side beam 31D, the piezoelectric element that performs driving P7 is provided in an area positioned on the mass body 15G side relative to the center of the base end side beam 31D in the width direction thereof. In the leading end side beam 32D, the piezoelectric element that performs driving P7 is provided in an area positioned on the mass body 15G side relative to the center of the leading end side beam 32D in the width direction thereof extending from the connecting position with the base end side beam 31D to the connecting position with the mass body 15G. Further, in the base end side beam 31D, the piezoelectric element that performs driving P8 is provided in an area positioned on the mass body 15H side relative to the center of the base end side beam 31D in the width direction thereof. In the leading end side beam 32D, the piezoelectric element that performs driving P8 is provided in an area positioned on the mass body 15H side relative to the center of the leading end side beam 32D in the width direction thereof extending from the connecting position with the base end side beam 31D to the connecting position with the mass body 15H.

The piezoelectric elements that perform driving P1 through P8 may be provided in any place as long as strain is generated therein in the drive vibration mode. Further, aside from a pair of positive and negative piezoelectric elements that perform driving being provided to each of the second detection-cum-drive beam sections 14A through 14D, only one of the pair of positive and negative piezoelectric elements that perform driving may be provided thereto. If at least one piezoelectric element that performs driving is matched with the polarity of strain generated in the drive vibration mode, the second detection-cum-drive beam sections 14A through 14D are able to be bent within the plate surface in a direction perpendicular or substantially perpendicular to the diagonal line of the vibration body 11 by driving that piezoelectric element that performs driving.

In the base end side beams 31A through 31D of the second detection-cum-drive beam sections 14A through 14D, the piezoelectric elements that perform monitoring PM are provided at both sides of each of the base end side beams 31A through 31D sandwiching the center of the beam in the width direction thereof near the connecting positions with the first detection beam sections 13A through 13D. The piezoelectric element that performs monitoring PM is provided to perform feedback control on the drive voltage of each of the piezoelectric elements that perform driving P1 through P8, expands/contracts along with the vibrations of the vibration body 11 in the drive vibration mode, that is, the bending of the second detection-cum-drive beam sections 14A through 14D in a direction perpendicular or substantially perpendicular to the diagonal line of the vibration body 11, and generates electric charge in accordance with the vibrations of the vibration body 11 in the drive vibration mode.

The piezoelectric element that performs monitoring PM may be provided in any area on the second detection-cum-drive beam sections 14A through 14D as long as the polarity of strain generated in the beam in the drive vibration mode becomes a single one in that area. Further, the number of the piezoelectric elements that perform monitoring PM may be singular or plural. The vibrations in the drive vibration mode are able to be stabilized by feedback control on the drive voltages of the piezoelectric elements that perform driving P1 through P8 by using the piezoelectric elements that perform monitoring PM.

The piezoelectric elements that perform detecting PX1 and PX2 are attached substantially to the overall surfaces of the first detection beam sections 13A and 13C, respectively, in a mirror symmetry arrangement. The piezoelectric elements that perform detecting PX1 and PX2 expand/contract along with the bending in the Z axis direction generated in the first detection beam sections 13A and 13C in the first detection vibration mode of the vibration body 11, and generate electric charge in accordance with the vibrations in the first detection vibration mode. Since the phase of a signal that perform detecting the first detection vibration mode is in a reversed state between the piezoelectric element that performs detecting PX1 and the piezoelectric element that performs detecting PX2, it is possible to obtain output in accordance with the angular velocity about the X axis by performing differential amplification on output signals of the piezoelectric element that performs detecting PX1 and the piezoelectric element that performs detecting PX2.

In the second detection vibration mode of the vibration body 11, expansion and contraction are generated in each of the piezoelectric elements that perform detecting PX1 and PX2 so that electric charge generated in the interior (electrode layer) of each of the piezoelectric elements that perform detecting PX1 and PX2 cancels out each other. Because of this, the piezoelectric elements that perform detecting PX1, PX2 hardly detect vibrations in the second detection vibration mode. Further, in the third detection vibration mode of the vibration body 11, the first detection beam sections 13A, 13C hardly deform and the piezoelectric elements that perform detecting PX1, PX2 do not detect the third detection vibration mode.

The piezoelectric elements that perform detecting PX1 and PX2 may be provided in any area on the first detection beam sections 13A and 13C as long as the polarity of strain generated in the beam in the first detection vibration mode becomes a single one in that area. Even if vibrations in other vibration modes than the first detection vibration mode are generated in the areas where the piezoelectric elements that perform detecting PX1 and PX2 are provided, detection sensitivity to the vibrations in the first detection vibration mode is able to be increased through signal processing such as differential amplification or the like performed in a subsequent detection circuit so as to remove influence of the vibrations in other vibration modes than the first detection vibration mode.

The piezoelectric elements that perform detecting PY1 and PY2 are attached substantially to the overall surfaces of the first detection beam sections 13B and 13D, respectively, in a mirror symmetry arrangement. The piezoelectric elements that perform detecting PY1 and PY2 expand/contract along with the bending in the Z axis direction generated in the first detection beam sections 13B and 13D in the second detection vibration mode of the vibration body 11, and generate electric charge in accordance with the vibrations in the second detection vibration mode. Since the phase of a signal detecting the second detection vibration mode is in a reversed state between the piezoelectric element that performs detecting PY1 and the piezoelectric element that performs detecting PY2, it is possible to obtain output in accordance with the angular velocity about the Y axis by performing differential amplification on output signals of the piezoelectric element that performs detecting PY1 and the piezoelectric element that performs detecting PY2.

In the first detection vibration mode of the vibration body 11, expansion and contraction are generated in each of the piezoelectric elements that perform detecting PY1 and PY2 so that electric charge generated in the interior (electrode layer) of each of the piezoelectric elements that perform detecting PY1 and PY2 cancels each other out. Because of this, the piezoelectric elements that perform detecting PY1, PY2 hardly detect the first detection vibration mode. Further, in the third detection vibration mode of the vibration body 11, the first detection beam sections 13A, 13C hardly deform and the piezoelectric elements that perform detecting PY1, PY2 do not detect the third detection vibration mode.

The piezoelectric elements that perform detecting PY1 and PY2 may be provided in any area on the first detection beam sections 13B and 13D as long as the polarity of strain generated in the beam in the second detection vibration mode becomes a single one in that area. Even if vibrations in vibration modes other than the second detection vibration mode are generated in the areas where the piezoelectric elements that perform detecting PY1 and PY2 are provided, detection sensitivity to the vibrations in the second detection vibration mode is able to be increased through signal processing such as differential amplification or the like performed in a subsequent detection circuit so as to remove influence of the vibrations in other vibration modes than the second detection vibration mode.

The piezoelectric elements that perform detecting PZ1, PZ2, PZ3, and PZ4 are attached to the second detection-cum-drive beam sections 14A, 14B, 14C, and 14D, respectively, in a mirror symmetric arrangement. To be more specific, in the leading end side beam 32A of the second detection-cum-drive beam section 14A, the piezoelectric element that performs driving PZ1 is provided in an area positioned on the center base portion 12 side relative to the center of the leading end side beam 32A in the width direction thereof extending from the connecting position with the mass body 15A to the connecting position with the mass body 15B. In the leading end side beam 32B of the second detection-cum-drive beam section 14B, the piezoelectric element that performs detecting PZ2 is provided in an area positioned on the center base portion 12 side relative to the center of the leading end side beam 32B in the width direction thereof extending from the connecting position with the mass body 15C to the connecting position with the mass body 15D. In the leading end side beam 32C of the second detection-cum-drive beam section 14C, the piezoelectric element that performs driving PZ3 is provided in an area positioned on the center base portion 12 side relative to the center of the leading end side beam 32C in the width direction thereof extending from the connecting position with the mass body 15E to the connecting position with the mass body 15F. In the leading end side beam 32D of the second detection-cum-drive beam section 14D, the piezoelectric element that performs driving PZ4 is provided in an area positioned on the center base portion 12 side relative to the center of the leading end side beam 32D in the width direction thereof extending from the connecting position with the mass body 15G to the connecting position with the mass body 15H.

The piezoelectric elements that perform driving PZ1, PZ2, PZ3, and PZ4 expand/contract along with the bending generated in the second detection-cum-drive beam sections 14A, 14B, 14C, and 14D in a direction along the diagonal line of the vibration body 11 in the third detection vibration mode of the vibration body 11, and generate electric charge in accordance with the vibrations in the third detection vibration mode. Since the phase of a signal that perform detecting the third detection vibration mode is in a reversed state between the piezoelectric elements that perform detecting PZ1, PZ3 and the piezoelectric elements that perform detecting PZ2, PZ4, it is possible to obtain output in accordance with the angular velocity about the Z axis by performing differential amplification on output signals of the piezoelectric elements that perform detecting PZ1, PZ3 and the piezoelectric elements that perform detecting PZ2, PZ4.

In the first and second detection vibration modes of the vibration body 11, the bending in a direction along the diagonal line of the vibration body 11 is hardly generated in the second detection-cum-drive beam sections 14A, 14B, 14C, and 14D, such that the piezoelectric elements that perform detecting PZ1, PZ2, PZ3, and PZ4 detect none of the first and second detection vibration modes.

The piezoelectric elements that perform detecting PZ1, PZ2, PZ3, and PZ4 are able to be provided in any area on the second detection-cum-drive beam sections 14A through 14D as long as the polarity of strain generated in the beam in the third detection vibration mode becomes a single one in that area. Even if vibrations in other vibration modes than the third detection vibration mode are generated in the areas where the piezoelectric elements that perform detecting PZ1, PZ2, PZ3, and PZ4 are provided, detection sensitivity to the vibrations in the third detection vibration mode is able to be increased through signal processing such as differential amplification or the like performed in a subsequent detection circuit so as to remove influence of the vibrations in other vibration modes than the third detection vibration mode.

Figure 7:
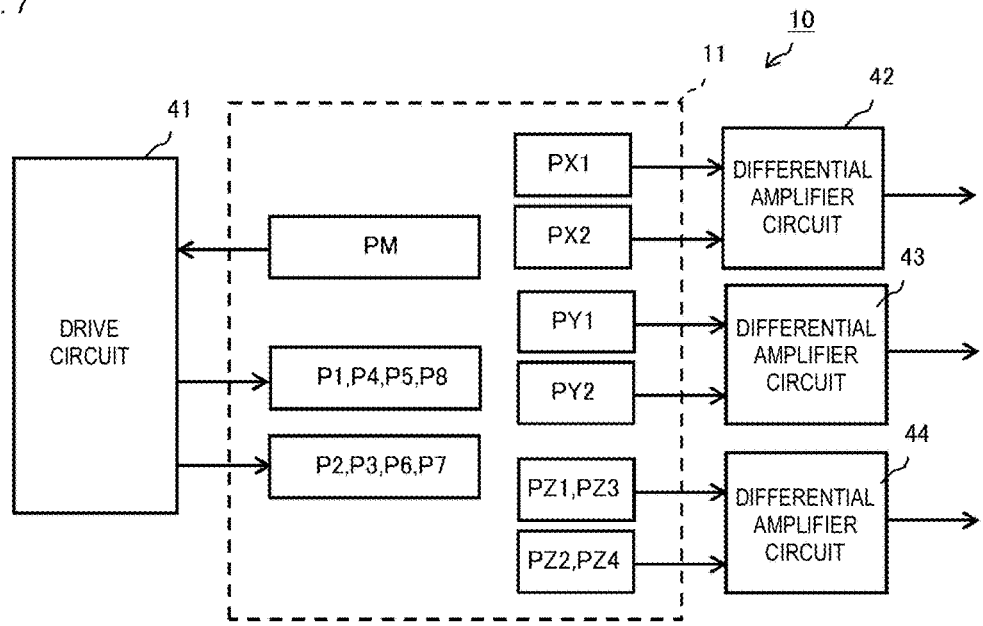
FIG. 7 is a schematic block diagram of the angular velocity detection device according to the first preferred embodiment of the present invention.
Figure 8A:
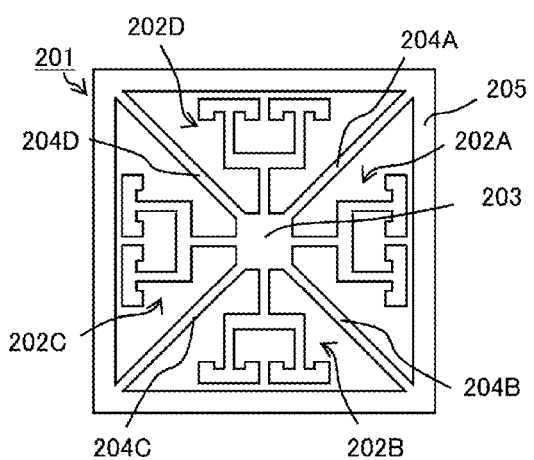
FIGS. 8A and 8B are views respectively illustrating angular velocity detection devices according to known examples.
Figure 8B:
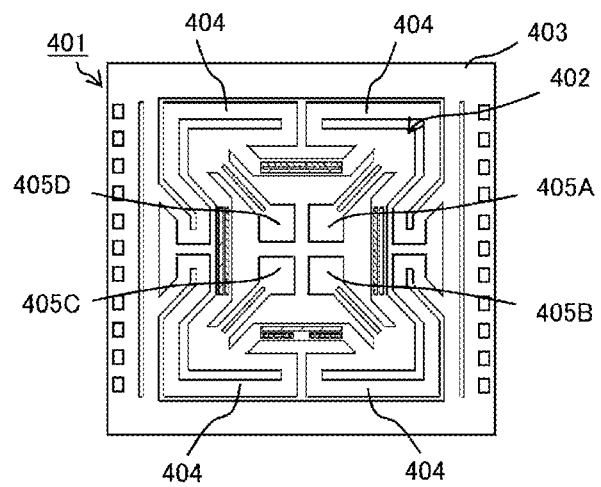

FIG. 7 is a schematic block diagram of the angular velocity detection device 10.

The angular velocity detection device 10 includes the piezoelectric elements PX1, PX2, PY1, PY2, PZ1 through PZ4, P1 through P8, and PM provided in the vibration body 11; a drive circuit 41; and differential amplifier circuits 42, 43, and 44. The drive circuit 41 outputs two types of AC power having the same amplification and opposite phases to each other, and controls the phase and amplitude of the AC power to be outputted based on the output voltage of the piezoelectric element that performs monitoring PM. One of the two types of AC power outputted by the drive circuit 41 is inputted to the piezoelectric elements that perform driving P1, P4, P5, and P8. The other of the two types of AC power outputted by the drive circuit 41 is inputted to the piezoelectric elements that perform driving P2, P3, P6, and P7. The differential amplifier circuit 42 performs differential amplification on an output signal of the piezoelectric element that performs detecting PX1 and an output signal of the piezoelectric element that performs detecting PX2 to output a signal in accordance with the vibrations in the first detection vibration mode. The differential amplifier circuit 43 performs differential amplification on an output signal of the piezoelectric element that performs detecting PY1 and an output signal of the piezoelectric element that performs detecting PY2 to output a signal in accordance with the vibrations in the second detection vibration mode. The differential amplifier circuit 44 performs differential amplification on an output signal of the piezoelectric elements that perform detecting PZ1, PZ3 and an output signal of the piezoelectric elements that perform detecting PZ2, PZ4 to output a signal in accordance with the vibrations in the third detection vibration mode. Through the differential amplification performed by the differential amplifier circuits 42, 43, and 44 on the signals corresponding to the vibrations in the respective detection vibration modes, noise generated by vibrations in other vibration modes than the detection vibration modes of detection target or the like is removed, thus making it possible to detect, with high precision, signals of the detection vibration modes of detection target.

Since the angular velocity detection device 10 according to the first preferred embodiment of the present invention preferably has the unique structure described above, angular velocities about the three axes of the orthogonal coordinate system are able to be isolated from one another and detected. In addition, the angular velocity detection device 10 is able to detect angular velocities at a high level of sensitivity while suppressing the resonant frequency of the drive vibration mode.

Since the second detection-cum-drive beam sections 14A through 14D each preferably have a T shape, rigidity of the leading end side beams 32A through 32D is able to be made low. This makes it possible to lower a vibration frequency in the third detection vibration mode and improve detection sensitivity to an angular velocity about the Z axis. Although the first detection beam sections 13A through 13D each preferably have a T shape, it is preferable for widths (thickness) of the leading end side beams 22A through 22D to be set such that rigidity of the leading end side beams 22A through 22D is prevented from being too low. High rigidity of the leading end side beams 22A through 22D is advantageous for improving detection sensitivity to an angular velocity about the Z axis.

The present invention can be also implemented with a vibration body having a different structure from the structure discussed in the first preferred embodiment. For example, in the base end side beams 32A through 32D of the second detection-cum-drive beam sections 14A through 14D, by providing slits extending along the diagonal lines of the vibration body so as to suppress the rigidity of the base end side beams 32A through 32D, vibration amplitude in the drive vibration mode is able to be magnified.

Further, the driver, detector, or the like may have other configurations than the configurations discussed above, and specific arrangement of the piezoelectric elements, circuit configurations, and the like are not limited to the above-discussed configurations.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An angular velocity detection device comprising:
   a vibration body including an outer periphery;
   a driver that vibrates the vibration body; and
   a detector that detects vibrations generated in the vibration body due to action of an angular velocity and outputs an output signal in accordance with the angular velocity; wherein
   the vibration body includes:
   a center base portion fixedly provided at a center of the outer periphery;
   four first detection beam sections that extend from the center base portion in parallel or substantially in parallel with corresponding ones of four sides defining the outer periphery, fork into two branches extending in two side directions along each side of the outer periphery, and are connected to each other at four corners of the outer periphery;
   four second detection-cum-drive beam sections that extend from the first detection beam sections toward the center base portion side along a respective diagonal line of the outer periphery, and fork into two branches extending in two side directions along the center base portion and the first detection beam sections; and eight mass bodies connected to both ends of each of the second detection-cum-drive beam sections extending along the first detection beam sections; wherein each diagonal line extends from one of the four corners of the outer periphery to another one of the four corners of the outer periphery that is opposite to the one of the four corners of the outer periphery;

the driver causes each of the second detection-cum-drive beam sections to perform flexural vibration in a direction perpendicular or substantially perpendicular to the respective diagonal line; and the vibration body has a square or substantially square shape as a whole when the vibration body is viewed from a direction perpendicular or substantially perpendicular to a plate surface of the vibration body.

2. The angular velocity detection device according to claim 1, wherein the center base portion has a square or substantially square shape when the vibration body is viewed from the direction perpendicular or substantially perpendicular to the plate surface of the vibration body, and each side of the center base portion is arranged at an angle of 45 degrees relative to a corresponding one of the four sides defining the outer periphery.

3. The angular velocity detection device according to claim 1, wherein the driver includes a piezoelectric element that performs driving that is attached to the vibration body and vibrates the vibration body.

4. The angular velocity detection device according to claim 3, wherein the piezoelectric element that performs driving includes one or more piezoelectric elements that perform driving; and the one or more piezoelectric elements that perform driving are each attached to either a position where stress by action of the vibration body due to vibrations of the second detection-cum-drive beam section bending in a direction perpendicular or substantially perpendicular to the diagonal line of the outer periphery has a positive polarity or a position where the stress by action of the vibration body has a negative polarity.

5. The angular velocity detection device according to claim 4, wherein the piezoelectric element that performs driving provided at the position where the stress by action of the vibration body has a positive polarity and the piezoelectric element that performs driving provided at the position where the stress by action of the vibration body has a negative polarity.

6. The angular velocity detection device according to claim 1, wherein the detector includes a piezoelectric element that performs detecting that is attached to the vibration body and detects vibrations of the vibration body.

7. The angular velocity detection device according to claim 6, further comprising one or more of the piezoelectric elements that perform detecting, wherein the piezoelectric elements that perform detecting are each attached to either a position where stress by action of the vibration body due to vibrations generated in the vibration body by action of an angular velocity has a positive polarity or a position where the stress by action of the vibration body has a negative polarity.

8. The angular velocity detection device according to claim 7, wherein the piezoelectric element that performs detecting provided at the position where the stress by action of the vibration body has a positive polarity and the piezoelectric element that performs detecting provided at the position where the stress by action of the vibration body has a negative polarity.

9. The angular velocity detection device according claim 1, wherein the driver includes a piezoelectric element that performs monitoring that is attached to the vibration body and detects vibrations of the second detection-cum-drive beam section bending in a direction perpendicular or substantially perpendicular to the respective diagonal line within the outer periphery.

10. The angular velocity detection device according to claim 9, further comprising one or more of the piezoelectric elements that perform monitoring, wherein the piezoelectric elements that perform monitoring are each attached to either a position where stress by action of the vibration body due to vibrations of the second detection-cum-drive beam section bending in a direction perpendicular or substantially perpendicular to the respective diagonal line within the plate surface has a positive polarity or a position where the stress by action of the vibration body has a negative polarity.

11. The angular velocity detection device according to claim 1, wherein the vibration body includes a single base material defined by a semiconductor wafer.

12. The angular velocity detection device according to claim 1, wherein the center base portion has one of a circular or substantially circular shape, a square or substantially square shape, and a polygonal shape.

13. The angular velocity detection device according to claim 1, wherein each of the four first detection beam sections has a T-shape.

14. The angular velocity detection device according to claim 1, wherein each of the four second detection-cum-drive beam sections has a T-shape.

15. The angular velocity detection device according to claim 1, wherein the vibration body vibrates in each of first, second and third detection vibration modes that is independent of a drive vibration.

16. The angular velocity detection device according to claim 1, wherein the four second detection-cum-drive beam sections include slits extending along the diagonal lines.

* * * * *